Sept. 9, 1969   L. T. TAGGART   3,465,983
SEAT BELT RETRACTOR
Filed May 14, 1962
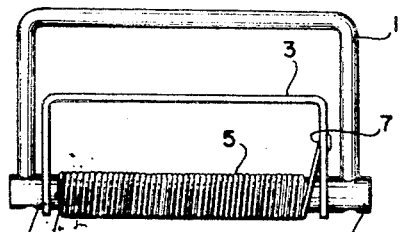
FIG_1
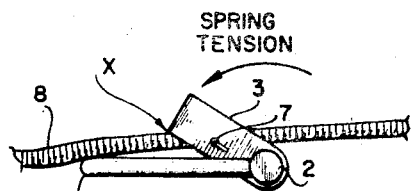
FIG_2
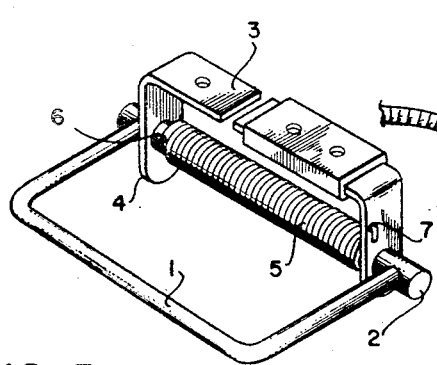
FIG_5
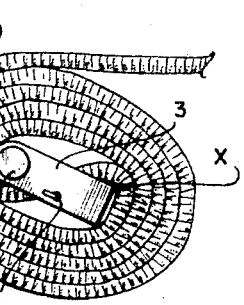
FIG_3
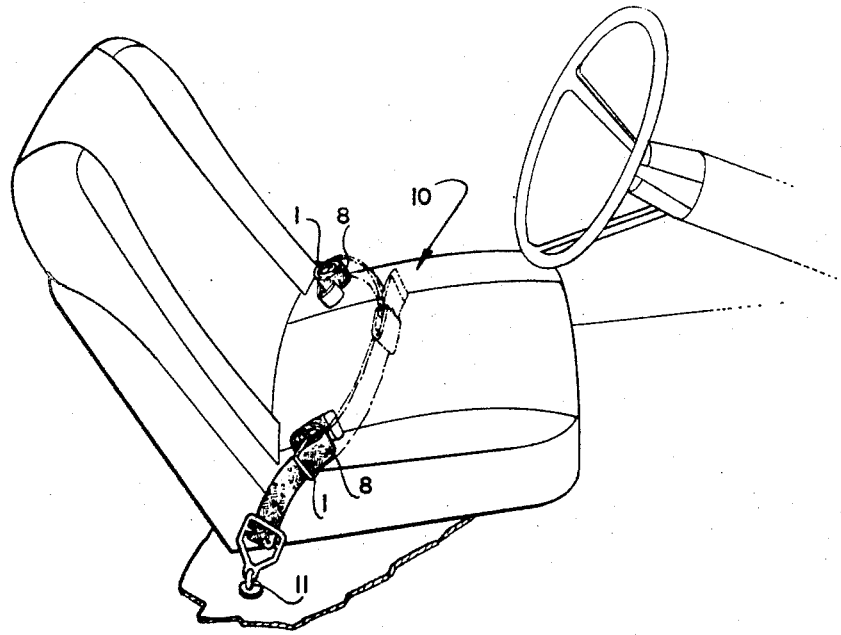
FIG_4
INVENTOR.
LAWRENCE T. TAGGART
BY *Albert K. Geer*
Attorney

United States Patent Office 3,465,983
Patented Sept. 9, 1969

3,465,983
SEAT BELT RETRACTOR
Lawrence T. Taggart, Bakersfield, Calif., assignor, by mesne assignments, to Borg-Warner Corporation, Chicago, Ill., a corporation of Illinois
Filed May 14, 1962, Ser. No. 194,615
Int. Cl. B65h 75/48; B60r 21/10; A47d 15/00
U.S. Cl. 242—107.11                                  6 Claims This invention relates to a belt take-up device and more particularly to a seat belt retractor for motor vehicles.

An object of the present invention is to provide means for retracting a seat belt.

A further object of the invention is to eliminate the unsightly appearance of safety belts lying on vehicle seats.

A further object of the invention is to provide a take-up device for webbing or belts which provides a neat appearance and does not affect the structural anchoring of one end of the webbing or belt.

These and other objects will become apparent from the following detail description and the drawings in which:

FIGURE 1 is a front view of a preferred embodiment of the invention,

FIGURE 2 is an end view of the device shown in FIGURE 1 and illustrating a first position as installed on a belt or web, FIGURE 3 is an end view of the device of FIGURE 2, illustrating the take-up or wound position of the device, FIGURE 4 is a side view of a typical vehicle seat illustrating the preferred embodiment of the invention, and FIGURE 5 is a modification of the embodiment of FIGURE 1.

There are many applications of flexible belts or webbing in which one end of the belt or webbing is firmly anchored and the other end left loose or free for purposes of attachment by suitable clamps, etc. to another belt or webbing. When the belt or webbing is unused the free ends of the belt or webbing are left loose and are not only an unpleasing appearance but are a nuisance since the loose ends are left free to be in the way of other operations.

One typical application of belting or webbing and to which the invention is particularly adapted is the familiar safety belts for vehicles, such as aircraft or automobiles. Safety belts are generally anchored at one end to the floor of the vehicle or to other stationary portions of the vehicle frame and the other end is attached to the free end of another belt by means of a buckle or conventional fastening means. Thus, two loose ends are provided for each passenger occupying seat. When a seat is first occupied the conventional safety belt arrangement requires a certain amount of searching for the proper matching loose ends, which are then placed around the occupant to restrain him in the seat. Such inconvenience and the accompanying discomfort of what to do with the loose ends when the belt is not in use and the seat is occupied is a considerable nuisance.

Referring now to FIGURE 1, a first loop 1 having a squared rectangular configuration is rigidly attached to a cross-bar 2. A second loop 3 having the same general shape as loop 1 is provided with apertures 4 which fit on the cross-bar 2 for free relative rotation therewith. A spring 5 is fixed at one end 6 to the cross-bar 2, and at the other end 7 to the smaller loop 3. Thus, it is seen that by rotating the smaller loop inside the larger or outer loop and about an axis common to both loops, the spring tension is increased and thereby stores a usable energy. It is to be noted that loop 1 has a round or circular cross section whereas loop 3 is preferably of rectangular cross section.

Now referring to FIGURE 2, the device is illustrated in combination with a belt or webbing 8, one end of which is generally rigidly attached to a permanent structure. As shown, the inner or smaller loop 3 has been rotated relative to the outer or larger loop 1 until a sufficient amount of tension, indicated by the arrow and legend, is built up in the spring to take-up the belt in the manner to be described. The belt or web 8 is inserted between the loops, under the smaller loop and over the larger loop.

Release of the free end of the web or belt then permits the two loops to rotate relative to each other, taking up the belt, or web, simultaneously from both ends; that is the smaller loop rotates inside the outer loop and pulls the belt from both directions through the space provided between the loops. The loop 3 is of rectangular cross section and provides a friction surface to the web or belt at point X in FIGURE 2. The outer loop being of circular cross section has a low friction and glides along the belt surface and in effect acts as a guide for the rotating inner loop. Of course, if desired the loop 3 may be stitched to the belt at about the middle of the free end of the belt, utilizing small holes as illustrated, as will be explained with reference to FIGURE 4. FIGURE 3 illustrates the retractor and belt of FIGURE 2 in a wound up condition, point X being shown for illustration purposes as now within the wound up portion.

Referring to FIGURE 4, a typical vehicle seat 10 is provided with a safety belt 8 having one end anchored in a floor bracket 11. The belt is shown as a typical installation passing around the edge of the seat cushion. In this configuration the metal trim (not shown) around the front seats may act to restrain the wound up belt. Or the safety belt may pass up between the seat and back rest near the edge of the seat cushion wherein the back and seat will stop the rolled up belt. To install the present invention, the belt is pulled tight as shown in dotted line and a point approximately at the center of the portion above the junction of the seat and back rest is selected and preferably marked. Then the retractor is wound until the spring is tight and slipped over the free end of the belt and down to the center previously marked. The smaller loop may be stitched to the belt or if preferred the edge of the loop may be serrated to prevent slipping on the belt. When the belt and retractor are released the belt is wound on the retractor in the manner shown in solid line and more in detail in FIGURE 3.

To facilitate installation on safety belts on which the buckles and end tabs have been placed and too large to pass through the smaller loop, the modification of FIGURE 5 may be used. In such case the inner loop 3 is cut and a movable sleeve 12 used to join the two pieces of the loop after the belt is inserted through the break.

While specific embodiments of the invention have been illustrated and described, it should be understood that various modifications or substitutions may be used without departing from the spirit of the invention as defined by the appended claims.

I claim:
1. In combination with a vehicle safety belt, a take-up device comprising a first rectangular loop of circular cross section, a second rectangular loop having three sides of rectangular cross section and having the fourth side closed by one side of said first loop, said second loop rotating within and with respect to said first loop, spring means attached between said loops and adapted to cause relative rotation between said loops when energy is stored therein, said belt passing over said first loop and under said second loop in the direction said second loop is biased to rotate.

2. A safety seat belt retractor comprising a pair of generally rectangularly shaped loops having a cross bar closing one side of each loop, one of said loops being larger than the other and rigidly attached to the cross bar, the smaller loop being free to rotate around the cross bar and within the larger loop, spring tension means on said cross bar and fixed at one end to said cross bar and at the other to said smaller loop, a flexible webbing material passing between the two loops, whereby said spring tension means rotates said small loop about said cross bar and winds up said webbing.

3. The safety belt retractor of claim 2 wherein said smaller loop is provided with means for attachment to said webbing.

4. The safety belt retractor of claim 3, wherein said larger loop is of circular cross section, and said smaller loop is of rectangular cross section.

5. A retractable safety belt structure for an automobile and the like having a seat and a rigid frame; comprising a pair of separate flat belt sections arranged respectively at opposite sides of a passenger resting on the seat so as to extend conjointly across the lap of the passenger for connection with each other, each of which belt sections has one end portion thereof anchored to said frame and its other end portion provided with a complementary part of a separable coupling unit; and a separate reel device floatingly arranged intermediately of the ends of each of said belt sections which reel device includes a rotatably mounted spring actuated reel having a slot through which the belt element is arranged to pass so as to automatically effect the winding on said reel and the unwinding from said reel of the intermediate portion of the belt section on which the device is floatingly arranged in such manner that when said belt portion is pulled from the reel device in fully extended working position the said belt portion will pass substantially freely through said reel device in fully unwound condition so as to transmit the final pull thereon directly to said frame.

6. A belt retractor comprising (a) an elongated casing, (b) means on said casing for attaching said casing to be a belt intermediate the ends thereof, (c) a spindle extending through said casing and journalled for rotation relative thereto, the ends of said spindle extending beyond said casing, (d) a coiled torsion spring circumposed about said spindle within said casing and having one end connected to said casing and the other end connected to said spindle, and (e) a generally U-shaped wire bail connected to said spindle in rigid relation thereto and arranged to engage the belt, (f) said spring effective to rotate said casing to rollup said belt on said casing.

References Cited
UNITED STATES PATENTS

| | | | |
|---|---|---|---|
| 1,657,190 | 1/1928 | Ballou | 24—68 |
| 2,051,735 | 8/1936 | Michelson | 242—107.11 |
| 2,923,492 | 2/1960 | Walpole et al. | 242—107.4 |
| 2,953,315 | 9/1960 | Lautier et al. | 242—107.4 |
| 2,993,680 | 7/1961 | Davis | 254—164 |
| 2,864,585 | 12/1958 | Gschwind | 254—152 |

CASMIR A. NUNBERG, Primary Examiner

U.S. Cl. X.R.
297—388